United States Patent [19]

Ishikawa et al.

[11] Patent Number: 4,884,148
[45] Date of Patent: Nov. 28, 1989

[54] CIRCUIT EMPLOYING A PLURALITY OF COUNTERS AND AN INTERPOLATOR FOR CONVERTING A VIDEO SIGNAL INTO A BINARY SIGNAL

[75] Inventors: Osamu Ishikawa; Mikihiko Sone; Yoshimi Suzuki, all of Tokyo, Japan

[73] Assignee: Oki Electric Industry Co., Ltd., Tokyo, Japan

[21] Appl. No.: 264,710

[22] Filed: Oct. 31, 1988

Related U.S. Application Data

[63] Continuation-in-part of Ser. No. 116,863, Nov. 4, 1987.

[30] Foreign Application Priority Data

Nov. 14, 1986 [JP] Japan .................. 61-269788
Nov. 14, 1986 [JP] Japan .................. 61-269789

[51] Int. Cl.$^4$ .................. H04N 1/40; H04N 5/228
[52] U.S. Cl. .................. 358/464; 358/163; 358/443
[58] Field of Search ............... 358/282, 285, 293, 294, 358/280, 163

[56] References Cited

U.S. PATENT DOCUMENTS

| 4,133,008 | 1/1979 | Tisue .................. | 358/282 |
| 4,446,486 | 5/1984 | Itoh .................. | 358/282 |
| 4,486,781 | 12/1984 | Wilmer et al. .................. | 358/163 |
| 4,562,486 | 12/1985 | Suzuki et al. .................. | 358/282 |
| 4,672,682 | 6/1987 | Naruse et al. .................. | 358/282 |

FOREIGN PATENT DOCUMENTS 57-104364  6/1982  Japan .................. 358/294
60-194873 10/1985  Japan .................. 358/280

OTHER PUBLICATIONS

A. J. Dattilo et al., "Variable Intensity Illumination Scanner Calibration System", IBM Technical Disclosure Bulletin, vol. 21, No. 9, Feb. 1979, pp. 3546-3547.

Primary Examiner—Edward L. Coles, Sr.
Assistant Examiner—Randall S. Svihla
Attorney, Agent, or Firm—Spencer & Frank

[57] ABSTRACT

A circuit for converting a video signal into binary signals comprising a line image sensor for performing photoelectric conversion of an object to be read thereby producing pixel signals. Means are also provided for setting reference levels for respective sections of the line image sensor, the sections being divisions of the entire length of the line image sensor. A comparator compares each pixel signal with the reference level for the section to which the pixel signal in question belongs, to produce a binary signal. An interpolator is further provided for receiving the digital reference level data as is a D/A converter for converting the output of the interpolator to an analog reference level signal and supplying it to the comparator.

4 Claims, 10 Drawing Sheets

CIRCUIT EMPLOYING A PLURALITY OF COUNTERS AND AN INTERPOLATOR FOR CONVERTING A VIDEO SIGNAL INTO A BINARY SIGNAL

Cross-Reference to Related Application

This is a continuation-in-part of application Ser. No. 07/116,863 filed Nov. 4th, 1987.

BACKGROUND OF THE INVENTION

The present invention relates to a circuit for converting an analog video signal into binary signals in an electronic black board, a telecopier and the like, and particularly to an improvement in setting the reference levels.

In electronic black boards, it is customary to use a fluorescent lamp FL as shown in FIG. 1 to illuminate a movable screen MS on which characters, symbols and pictures are written and light reflected from the movable screen MS is focused by a lens LZ onto a line image sensor such as a linear CCD (charge-coupled device) by which the optical signal is converted into an electrical signal, called a video signal. The video signal is compared with a slice level or reference level to produce a series of binary signals indicating black or white of respective pixels.

The light intensity of the fluorescent lamp FL is not uniform along its length, and it varies depending on the temperature of the tube. This means that the light intensity distribution varies with time after the fluorescent lamp is turned on. For instance when the fluorescent lamp has just been turned on the intensity is generally low but the upper part of the tube which is heated more quickly has a relatively high intensity, as shown in FIG. 2A. When the entire tube is fully heated, the intensity is the highest at the center and is decreased towards both ends, as shown in FIG. 2B. Moreover, the lens has a property by which the light having passed the lens has the intensity which is increased toward the optical axis.

As a result, the white level of the video signal varies with time and along the length of each scan.

To cope with the nonuniform distribution of the light intensity along the length of each scan, a shading plate having a greater shading rate toward the center has been used. But positioning the shading plate demands extreme accuracy and is time consuming. Moreover, it does not provide a measure against the change of the light intensity distribution with temperature.

Another solution is to electronically vary the reference level in conformity with the white level variation. This can be done by setting the reference level based on the signal levels obtained from the marginal area of the screen, before the processing of the object image signal (effective video signal) starts. Here, "marginal area" means the area on the screen adajcent to the edge of each effective area or "cut" of the images on the screen. By "cut" is meant that portion of the screen on which optically readable information to be processed is present, as shown in FIG. 3.

Usually nothing is written on the marginal area. But the user may write on the marginal area and there can be some smear on the marginal area, so that the device is expected to operate properly even if there are some writings or smears in the marginal area.

A prior art arrangement determines the white level for each dot of the line sensor based on data from several lines (scans): the highest of the levels of video signals of the same dot of the sensor obtained through the several lines is taken as the white level and a reference level is set based on the white level. For instance, the reference level is given by multiplying a coefficient, e.g., 0.7 with the white level.

But this prior art arrangement fails to find a proper white level when a black line (a written one or a smear) extends horizontally (normal to the length of the line sensor) over several lines.

SUMMARY OF THE INVENTION

An object of the invention is to permit setting of proper reference levels even when there is a horizontal black line or the like in the marginal area.

According to the invention, the screen is divided along the length of the image sensor into sections and the highest of the video signals within each section over several lines is regarded as the white level for the section and a reference level for the section is determined based on this white level. Here the term "highest" means "m-th highest" where m is a natural number.

DETAILED DESCRIPTION OF THE EMBODIMENTS

Figure 1:
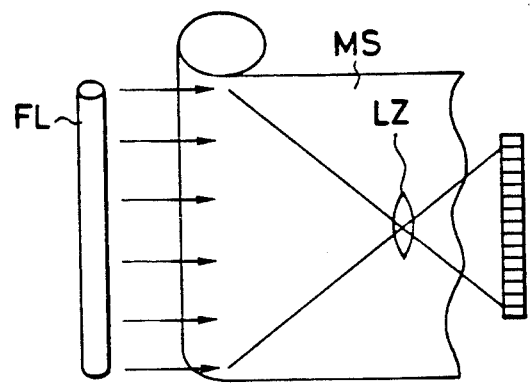
FIG. 1 is a schematic diagram showing the illumination and a line sensor.
Figure 2A:
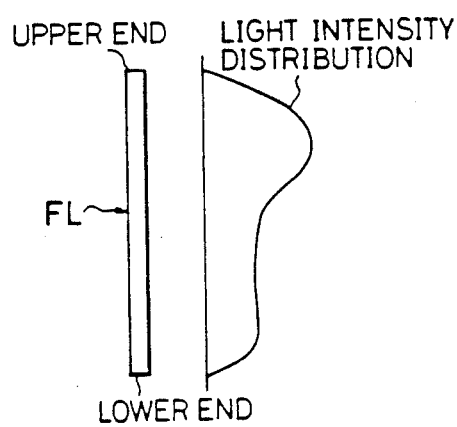
FIGS. 2A and 2B are diagrams showing the intensity distribution of a fluorescent lamp.
Figure 2B:
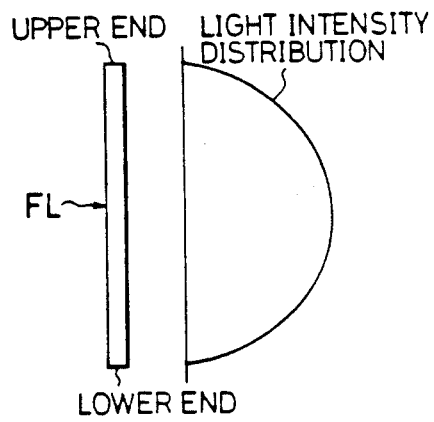
Figure 3:
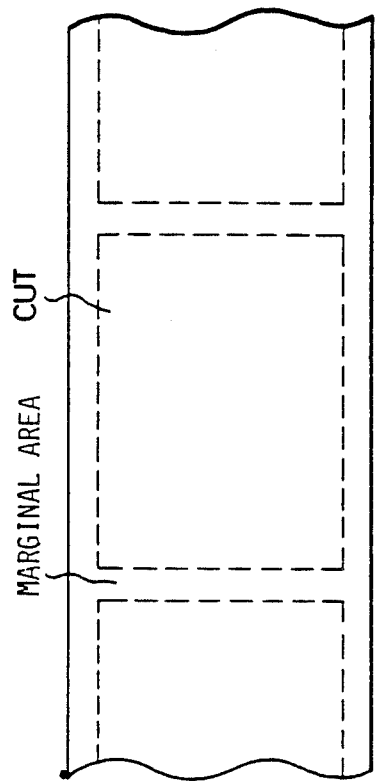
FIG. 3 is a schematic diagram showing an area for each "cut" and a marginal area.
Figure 4:
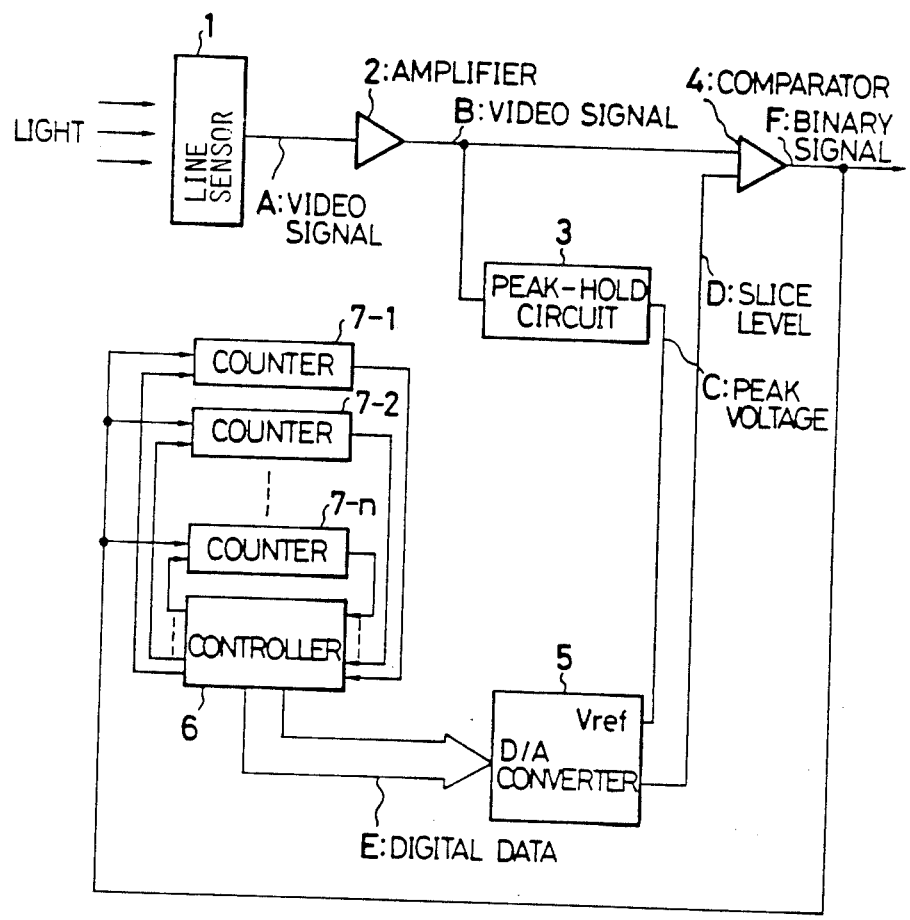
FIG. 4 is a block diagram showing an embodiment of the invention.

An embodiment of the invention will now be described with reference to FIG. 4.

In this embodiment, the entire height (direction parallel to the length of the lines) is evenly divided into 10 sections. The entire line consists of 1280 pixels and each section consists of 128 pixels. The tenth highest value of the pixel signals in each section is found to be the white level of the section. The white level is represented as a digital value of 6 bits, i.e., of 64 steps.

A line sensor 1 receives reflected light from a screen (recording medium) on which letters or pictures are written or drawn, and converts the light into electrical signals to produce a video signal A by scanning.

An amplifier 2 amplifies the video signal A to produce an amplified video signal B, which is input to a peak-hold circuit 3 and a comparator 4.

The peak-hold circuit 3 holds the peak value of the input that has been applied to it, and its output C is input to a reference voltage terminal Vref of a D/A (digital-to-analog) converter 5 to be used as the reference voltage. Supplied to the input data terminal of the D/A converter 5 is digital data E from a controller 6.

The digital data E is converted into an analog signal at the D/A converter 5 using the output (peak value) from the peak-hold circuit 3 as the reference voltage Vref.

The output of the D/A converter 5 is supplied to the comparator 4 as a threshold or slice level D used during the process of determining the white level.

The comparator 4 compares the video signal B with the slice level D to convert the video signal into a series of binary (pixel) signals F of "1" or "0" depending on whether or not the video signal B is larger than the slice level D. This means "1" corresponds to "white" (or bright) and "0" corresponds to "black" (or dark).

The binary signal F is input to n counters 7-1 to 7-n, which are sequentially enabled by the controller 6. The n counters are allotted to the n sections, respectively, and each counter is enabled when the pixel signals of the corresponding section are processed. The controller 6 in cooperation with each counter (7-1 to 7-n) serves to determine the tenth highest value of the video signals within the corresponding section. This is done by the binary search method. More specifically, the slice level for each section is initially set at the middle, i.e., 64/2. Each counter counts the number of "1" pixels (white pixels) in each section by being enabled while the binary signals of that section are produced. When the number of "1" pixels thus counted is not smaller than a predetermined value, i.e. 10 (because the tenth highest value of the video signals is being sought), then the slice level is increased by $64/2^2$: if not it is decreased by $64/2^2$. This process is repeated five times. The amount by which the slice level is increased or decreased is halved each time the process is repeated, so that at the fifth process, the amount by which the slice level is increased or decreased is $64/2^{5+1}=1$. The optimum slice level (the slice level which equals the white level) is thus reached while five lines are scanned. This slice level remaining at the end of the binary search is stored in the controller 6, and gives the tenth highest value of the video signals and is used as the white level.

The reason that the first highest value is not used as the white level is that there can be noise which gives rise to an especially bright spot which should be ignored.

Each of the counters 7-1 to 7-n may have a full scale (128) equal to the number of pixels in each section and may be so connected that the count value $118=128-10$ is set before the processing of the pixels signals of the corresponding section begins. It therefore counts up each time the comparator 4 finds that the pixel signal exceeds the slice level, and when the count value reaches the full scale 128 and overflows, it produces an overflow signal. This overflow signal is detected by the controller 6, which thereby judges that the number of pixels having a higher pixel signal than the slice level is not smaller than the predetermined value, $m=10$.

The controller 6 multiplies the white level with a coefficient, e.g., 0.7 to produce a slice level that should be used during processing of effective data, i.e., data from the "cut" in question. This slice level, used during processing of effective data, is called the reference level.

During processing of the effective data, the controller 6 sequentially selects the reference level corresponding to the section of which the pixel signals are being processed.

Figure 5:
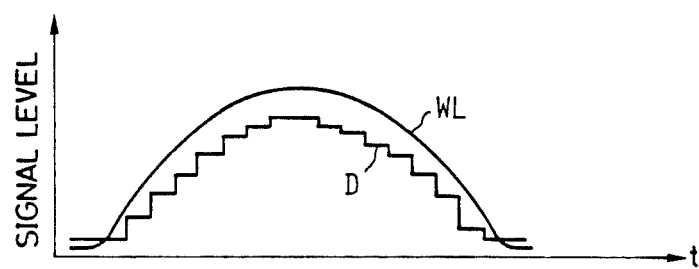
FIG. 5 is a schematic diagram showing reference levels for respective sections.

FIG. 5 schematically illustrates the reference levels D for the respective sections with an example of white level WL along each scan (i.e., along the abscissa).

Figure 6:
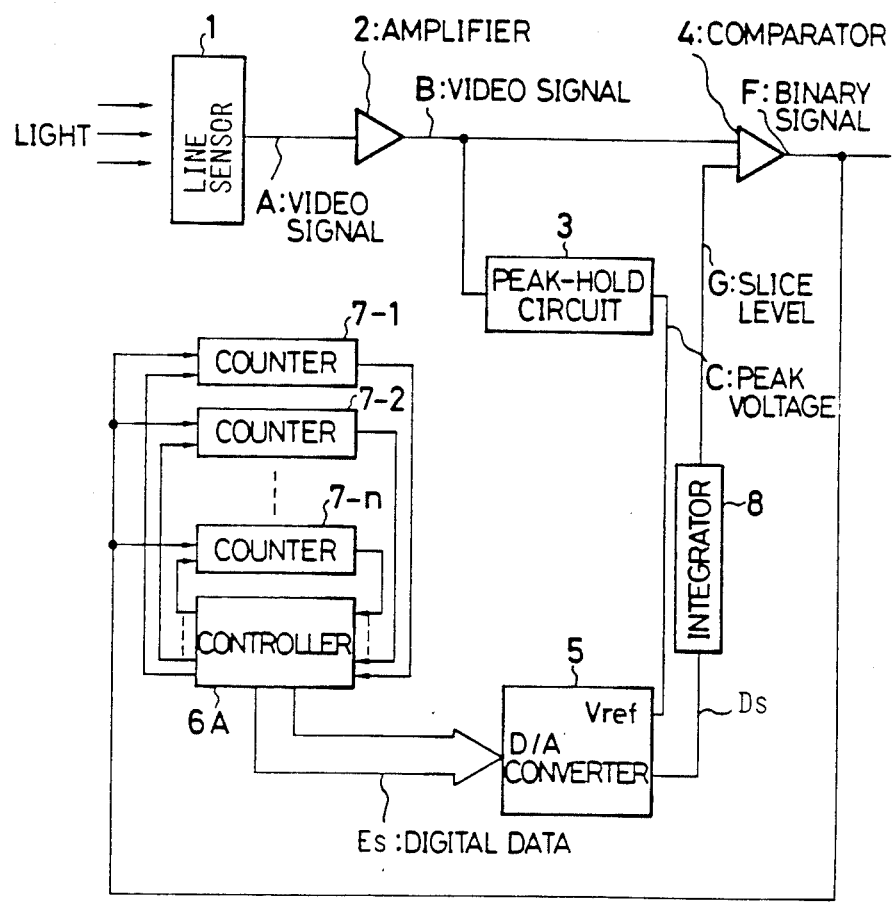
FIG. 6 is a block diagram showing another embodiment of the invention.

FIG. 6 shows another embodiment of the invention. The embodiment of FIG. 6 is basically identical to the embodiment of FIG. 4 but it differs in the provision of an integrator 8 inserted between the D/A converter 5 and the comparator 4. In addition, the controller 6A which is basically identical to the controller 6 of FIG. 4, produces digital data Es representing the lower one of the reference signals of the section of which the corresponding pixel signals are being produced from the line sensor 1 and of the section next (in the order of scan) to the abovementioned section. For the last section in the order of scan, the controller 6A produces, instead of the "lower one of the reference signals," the lower limit level within the signal level range.

Figure 7:
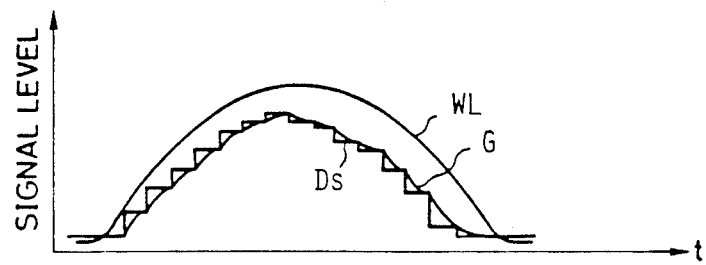
FIG. 7 is a schematic diagram showing reference levels for respective sections.

Assuming that the white level WL rises gradually until the middle of the line and then gradually falls as shown in FIG. 7, the reference levels Ds are in step with the white level WL in the region (left half in FIG. 7) where the white level WL ascends, and descends earlier than the white level WL in the region (right half in FIG. 7) where the white level WL descends. But the reference level G as output from the integrator 8 is in closer conformity with the white level WL. This is because the integrator's output lags behind its input: its output ascends gradually behind its input when its input rises stepwise, and its output descends gradually behind its input when its input falls stepwise.

The integrator 8 can be an RC integrator or a Miller integrator.

The embodiment of FIG. 6 has an advantage in that the reference level has a better conformity with the white level WL throughout each section. This compares with the embodiment of FIG. 4 where the reference level of each section has varying distance from the white level depending on the position within each section.

Figure 8:
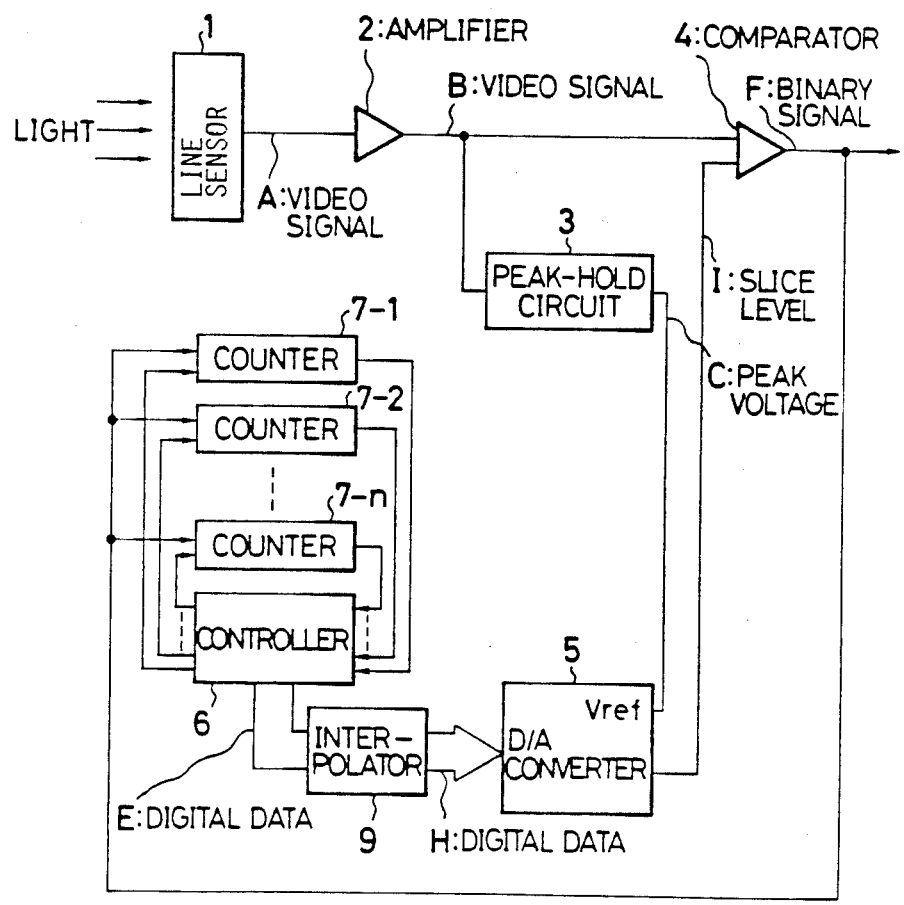
FIG. 8 is a block diagram showing a further embodiment of the invention.

FIG. 8 shows a further embodiment of the invention. The embodiment of FIG. 8 is basically identical to the embodiment of FIG. 4 but differs in the provision of an interpolator 9 between the controller 6 and the D/A converter 5. During the image reading, the interpolator 9 produces digital data H indicative of interpolated reference levels on the basis of the reference levels E for the respective sections i as supplied from the controller 6. The D/A converter 5 converts the digital data H into an analog signal I indicative of the interpolated reference level.

Figure 9:
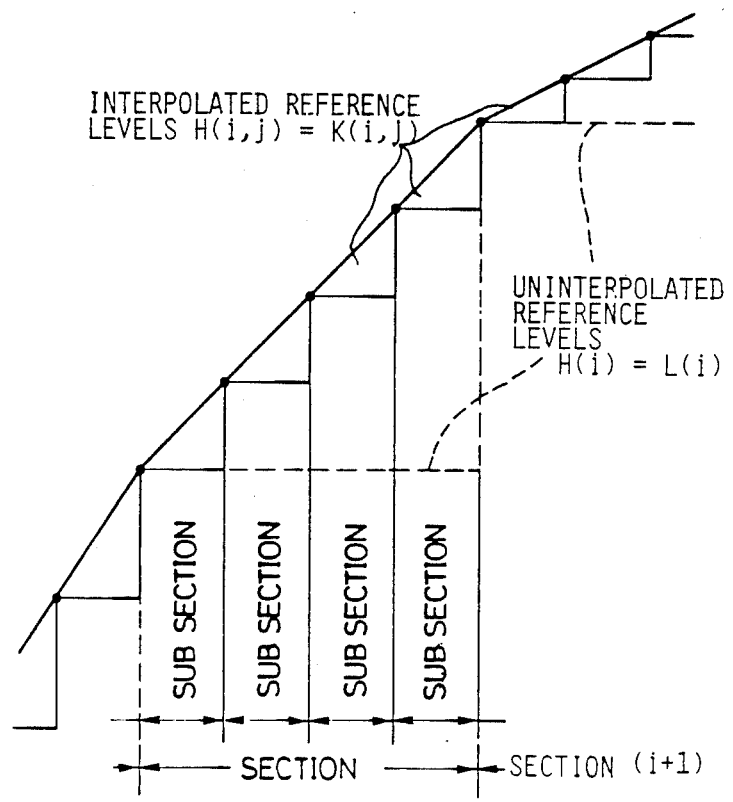
FIG. 9 is a schematic diagram showing reference levels for respective subsections.

FIG. 9 shows an example in which each section i (i=1, 2, ... n) is divided into four subsections j (j=0, 1, 2, 3) and an interpolated reference level K(i,j) is determined for each of the four subsections.

It will be seen from FIG. 9 that the reference levels K(i,j) for the respective subsections j (j=0, 1, 2, 3) in an arbitrary section i (i=1, 2, ... n) can be given by:

$$K(i,j)=[L(i)+j\times a(i)] \qquad (1)$$

$$a(i)=[L(i+1)-L(i)]/4 \qquad (2)$$

where L(i) represents the reference level for the section i.

The interpolator 9 receives the digital data E indicative of the reference levels L(i) and a select signal J from the controller 6 and outputs uninterpolated digital data H(i)=L(i) or interpolated digital data H(i,j)=-

K(i,j). When the apparatus is in the mode of image reading, the select signal J is high, and the interpolator 9 outputs the interpolated digital data H(i,j). When the apparatus is not in the mode of image reading, e.g. is in the mode of determining the reference levels, the select signal J is low and the interpolator 9 outputs the uninterpolated digital data H(i).

Figure 10:
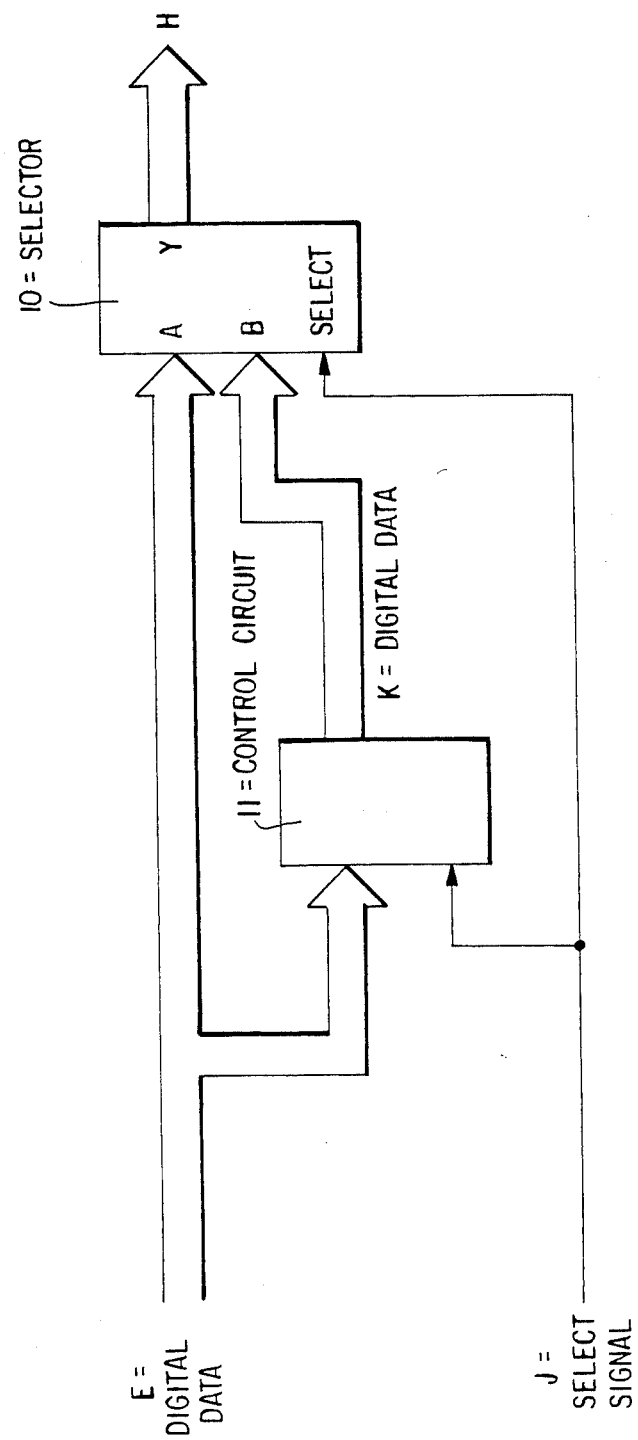
FIG. 10 is a block diagram showing an example of the interpolator of FIG. 8.

FIG. 10 shows an example of the interpolator 9 of FIG. 8. It comprises a selector 10 and a control circuit 11. The control circuit 11 receives the digital data E (indicative of L(i)) and the select signal J from the controller 6. The control circuit 11 performs interpolation in a manner described later and outputs the interpolated digital data K(i,j). The selector 10 receives the digital data E indicative of L(i), the select signal J from the controller 6 and the digital data K(i,j) from the control circuit 11, and selectively outputs either the digital data E or the digital data K(i,j) in accordance with the select signal J. Specifically, it selects the digital data E when the select signal J is low and selects the digital data K(i,j) when the select signal J is high. This can be summarized as follows: If J=high, the output of the selector 10 is H(i,j)=K(i,j). If J=low, the output of the selector 10 is H(i)=L(i).

The output of the selector 10, which is the digital data H, is supplied to the D/A converter 5.

Let us assume that the white level WL has been detected and the apparatus is now in the image reading mode. The controller 6 sets (raises high) the select signal J. The controller 6 then successively outputs the digital signals E indicative of the reference levels L(i) (which may be determined by for example 0.7 x white level WL) for the respective sections i (i=1 to n). The control circuit 11 then stores the uninterpolated reference levels L(i) for the respective sections i and also performs calculation of the equation (2) to produce fractions a(i). Control circuit 11 also stores the fractions a(i) in preparation for the image reading from the effective area, and performs, during image reading, further calculation of the equation (1) on the reference levels L(i) for the respective sections and the fractions a(i). The control circuit then outputs the digital data indicative of the interpolated reference levels K(i,j).

Figure 11A:
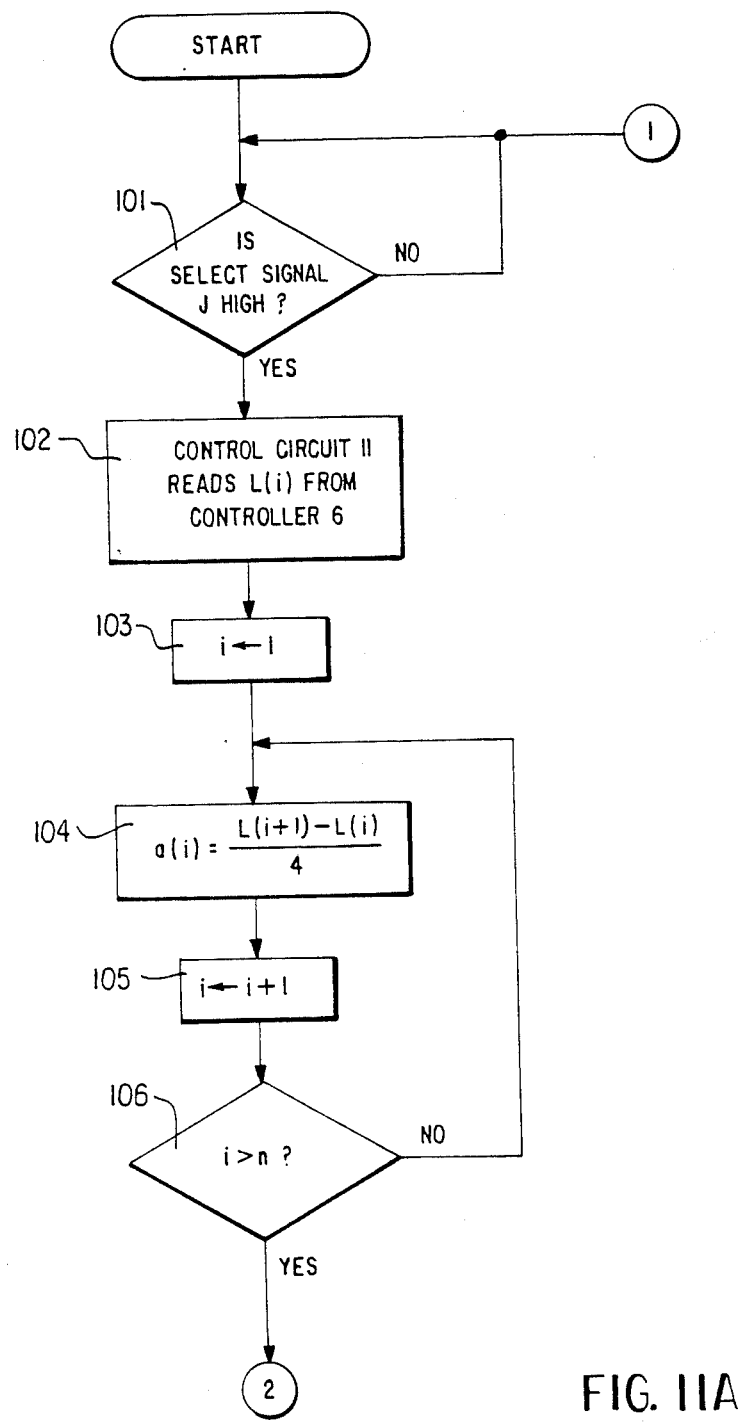
FIGS. 11A and 11B are flowcharts showing operation of the interpolator of FIG. 10.
Figure 11B:
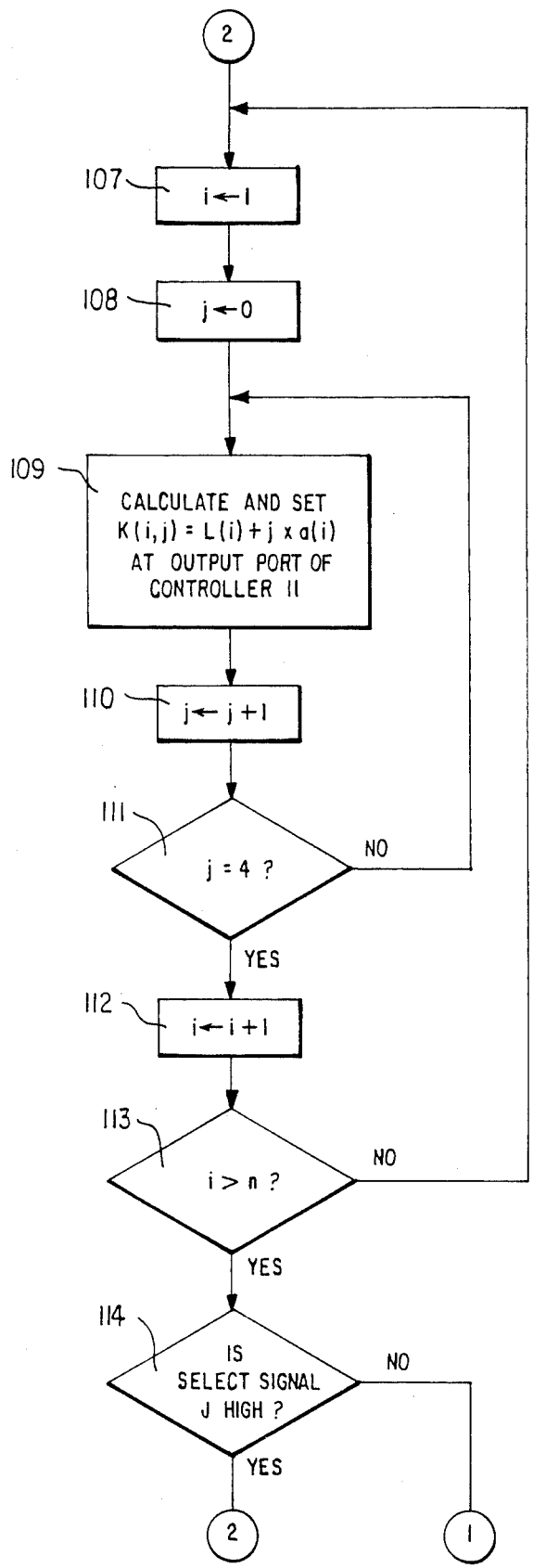

The operation of the interpolator 9 during the process of determining the above-mentioned fractions a(i) and during the process of the above-mentioned further calculation of the equation (1) is shown in FIG. 11A and FIG. 11B.

In FIG. 11A and FIG. 11B, the steps 101 to 106 are performed for the calculation of the above-mentioned fractions a(i). When the select signal J becomes high (101) the control circuit 11 reads the reference levels L(1) to L(n) of the digital data E for the respective sections 1 to n (102), and stores the levels L(1) to L(n) in the memory provided in the control circuit 11.

The control circuit 11 then calculates the fraction a(i) for each of the sections 1 to n by dividing the difference L(i+1)−L(i) by the number of subsections in each section, e.g., 4 in the example illustrated. First, parameter i is set at 1 (103), and the fraction is calculated according to the above equation (2) as shown in the step 104. The calculated fraction a(i) is stored in the memory provided in the control circuit 11. Then, the parameter i is incremented (105), and judgment is made whether the parameter i is greater than n (106), and if it is not greater than n the steps 104, 105 and 106 are repeated.

When calculation of the equation (2) has been conducted for all of the sections 1 to n, the fractions a(i) for all of the sections are stored in the memory in the control circuit 11. The stored fractions a(i) are maintained, repeatedly read and used for the determination of the reference levels K(i,j) for the subsections in the respective sections. This process is shown in steps 107 through 114.

First, the parameter i is again set at 1 (107). Then, the parameter j is set at 0 (108). Then, at step 109, an interpolated value K(i,j) for the subsection j (FIG. 9) in the section in question is calculated in accordance with the equation (1). The calculated interpolated value K(i,j) is set in a latch circuit at the output port of the control circuit 11 and applied to the selector 10. As described earlier, the selector 10 selects the output of the control circuit 11 while the select signal J is high. Then, the parameter j is incremented (110), and judgment is made whether the parameter j equals 4 (111), and if it does not the steps 109, 110 and 111 are repeated.

When the calculation of the equation (1) is repeated for all the subsections in the section in question, then, the parameter i is incremented (112) and judgment is made whether or not the parameter i exceeds n (113). If it does not, the operation returns to the step 108, so that the calculation of the interpolated values K(i,j) are repeated for all the sections 1 to n.

When, at the step 113, i is found to exceed n, the select signal J is checked again. The process of the steps 107 through 114 is conducted in step with the reading and processing of the pixel signals from each line scanned by the image sensor. In other words, each time one line of image is scanned, the step 107 is performed once and the step 114 are performed once. If at the step 114 it is found that the select signal J is still high meaning that processing of the pixel signals from another line is being performed, the calculation of the interpolated values K(i,j) (steps 107 to 114) are repeated. If the select signal J is low, the operation is returned to step 101 to wait for the subsequent image reading operation.

Examples of commercially available circuit units that can be used for the control circuit 11 are Intel P8031AH and NEC uPD8255AC-2. An example of a commercially available circuit unit that can be used for the selector 10 is Texas Instruments 74LS257.

In the embodiment shown in FIG. 8 the calculation of equation (2) is performed (for all the sections) before, or at the commencement of the reading of image from an effective area, and the calculation of the equation (1) is performed (for the respective subsections in the respective sections) each time pixel signals of each subsection are read and compared with the reference levels. In a modification, the calculations of the equations (1) and (2) may be performed for all the subsections in all the sections and the results (reference levels) may be stored in a memory having a sufficient capacity to store all the reference levels. This arrangement has an advantage in that the subsequent image reading processing can be made at a higher speed. The controller 6 and the control circuit 11 may be combined into a single unit to eliminate the duplication of memories for storing the reference levels L(1) to L(n).

What is claimed:

1. A circuit for converting a video signal comprising a series of pixel signals into a binary video signal comprising a series of corresponding binary signals, said pixel signals being obtained by photoelectrically reading an object having an effective area in which information to be read is present and a marginal area outside the effective area, comprising:

a line image sensor comprising a plurality of sensor elements for photoelectrically reading the object line by line to produce pixel signals indicative of brightness levels of pixels forming each line of the object, each pixel signal being produced by a corresponding one of the sensor elements;

means responsive to the pixel signals produced by the line image sensor for setting respective reference levels for sections into which said line image sensor is divided, each section consisting of a plurality of adjacent ones of the sensor elements, said reference level setting means including means for producing digital reference level data for each of said sections from the pixel signals produced by the line image sensor, an interpolator for producing interpolated digital reference level data for each of a plurality of subsections into which said sections are divided from the digital reference level data, and a D/A converter for converting said interpolated digital reference level data into corresponding analog reference level signals; and a comparator for comparing each pixel signal with the analog reference level signal for the subsection to which the sensor element which produced the pixel signal belongs to produce the corresponding binary signal.

2. A circuit according to claim 1 wherein said means for producing digital reference level data comprises means for determining a white level for each section by setting the white level for each section equal to the value of the pixel signal having the m-th highest value among the pixel signals produced by the sensor elements in the corresponding section, where m is an integer, and means for determining the digital reference level data for each section from the corresponding white level.

3. A circuit according to claim 1 which further comprises a peak-hold circuit for receiving said pixel signals and for holding the value of one of the pixel signals which has the highest value as a peak value; and wherein said D/A converter converts the interpolated digital reference level data into the corresponding analog reference level signals on the basis of the peak value.

4. A circuit for converting a video signal comprising a series of pixel signals into a binary video signal comprising a series of corresponding binary signals, said pixel signals being obtained by photoelectrically reading an object having an effective area in which information to be read is present and a marginal area outside the effective area, comprising:

a line image sensor comprising a plurality of sensor elements for photoelectrically reading the object line by line to produce pixel signals indicative of brightness levels of pixels forming each line of the object, each pixel signal being produced by a corresponding one of the sensor elements;

means responsive to the pixel signals produced by the line image sensor for setting respective reference levels for sections into which said line image sensor is divided, each section consisting of a plurality of adjacent ones of the sensor elements, said reference level setting means including means for producing digital reference level data for each of said sections from the pixel signals produced by the line image sensor, means for selecting for each of the sections the one of the digital reference level data for that section and the digital reference level data for a corresponding next one of the sections which has the smaller value, an interpolator for producing interpolated digital reference level data for each of a plurality of subsections into which said sections are divided from the selected digital reference level data, and a D/A converter for converting said interpolated digital reference level data into corresponding analog reference level signals; and a comparator for comparing each pixel signal with the analog reference level signal for the subsection to which the sensor element which produced the pixel signal belongs to produce the corresponding binary signal.

* * * * *